United States Patent Office 2,961,448
Patented Nov. 22, 1960

2,961,448

RECOVERY OF LIPOIC ACID

Lester J. Reed, Austin, Tex., and Richard C. Thomas, Jr., New Castle, Del., assignors to Research Corporation, New York, N.Y., a corporation of New York No Drawing. Filed Aug. 21, 1956, Ser. No. 605,434

5 Claims. (Cl. 260—327)

This invention relates to the recovery of lipoic acid from polymeric substances produced in the process of making lipoic acid and in its purification by recrystallization.

It has been found that in the production of DL-α-lipoic acid by the oxidation of DL-6,8-dithioloctanoic acid a sticky, colorless polymeric substance is produced as a by-product. This substance is also produced in the purification of crude α-lipoic acid by fractional crystallization and it has been found that α-lipoic acid is converted into the polymeric substance by the action of heat or light. The polymeric substance can be separated from α-lipoic acid by extraction of the α-lipoic with benzene.

The polymeric substance is insoluble in benzene and most of the common organic solvents. It is slightly soluble in ethanol.

The ultraviolet absorption spectrum of the polymeric material resembles that of saturated organic disulfides, characterized by a relatively weak and rather broad maximum near 250 m$\mu$. The spectrum shows only low end absorption in the 330 m$\mu$ region where α-lipoic acid exhibits an absorption maximum.

It is believed that the substance is a linear disulfide polymer. Its formation in the production and purification of α-lipoic acid results in a substantial loss in yield.

We have now found that the polymeric substance may be readily converted into α-lipoic acid by treatment with aqueous alkaline solutions, either in the semi-solid state or in suspension or solution in a water-miscible organic solvent. The conversion proceeds at room temperature but is accelerated by warming and is quite rapid at 100° C. resulting in a yellow aqueous solution of a salt of α-lipoic acid from which the α-lipoic acid may be recovered by acidification and extraction with a water-immiscible organic solvent.

The following examples are illustrative of the principles of the invention:

*Example I*

A mixture of 662 mg. of the polymeric substance and 15 ml. of 0.5 N sodium hydroxide was warmed on a steam bath for 15 minutes during which time the polymer gradually dissolved to give a bright yellow solution. The solution was acidified with hydrochloric acid and extracted with two 15-ml. portions of chloroform. The yellow chloroform extracts were combined, dried over anhydrous sodium sulfate and evaporated under vacuum. The residue was leached with two 1-ml. portions of benzene and 15 ml. of Skellysolve B (n-hexane fraction, B.P. 60–68° C.) was added. The resulting solution was seeded with a few crystals of DL-α-lipoic acid and allowed to crystallize at about 0° C. 465 mg. of yellow crystals of DL-α-lipoic acid, M.P. 62–63° C. were obtained.

*Example II*

To a solution of 545 mg. of the polymer in 54.5 ml. of 95% ethanol was added 54.5 ml. of 0.1 N sodium hydroxide. The resulting yellow solution was allowed to stand at room temperature for thirty minutes and then was poured into 100 ml. of water. Two ml. of 6 N hydrochloric acid was added and the mixture was extracted with two 15-ml. portions of chloroform. The yellow chloroform extracts were worked up as described in Example I and yielded 422 mg. of yellow crystals of DL-α-lipoic acid, M.P. 61–62° C.

Instead of sodium hydroxide other water-soluble alkaline substances may be used in the method of the invention, such as potassium hydroxide, sodium carbonate, sodium bicarbonate and ammonium hydroxide. In general, the conversion of the polymeric substance to α-lipoic acid is base catalyzed and proceeds rapidly at pH 12 at room temperature. The reaction rate is slower at less alkaline pH values and does not proceed to a measurable extent in the absence of alkali.

The course of the reaction can be followed by determining the amount of DL-α-lipoic acid in the reaction mixture by spectrophotometric readings taken at 332 m$\mu$.

We claim:

1. In a method of producing α-lipoic acid by the oxidation of DL-6,8-dithioloctanoic acid and the subsequent purification of crude α-lipoic acid wherein a benzene-insoluble linear disulfide polymer of α-lipoic acid is formed, the method of recovering salts of α-lipoic acid from said polymer which consists in subjecting said polymer to the action of an aqueous alkaline solution to produce a solution of the corresponding alkaline salt of α-lipoic acid.

2. The method of claim 1 wherein said alkaline solution has a pH of about 12.

3. In a method of producing α-lipoic acid by the oxidation of DL-6,8-dithioloctanoic acid and the subsequent purification of crude α-lipoic acid wherein a benzene-insoluble linear disulfide polymer of α-lipoic acid is formed, the method of recovering salts of α-lipoic acid from said polymer which consists in subjecting a dispersion of said polymer in a water-miscible organic solvent to the action of an aqueous alkaline solution to produce a solution of the corresponding alkaline salt of α-lipoic acid.

4. In a method of producing α-lipoic acid by the oxidation of DL-6,8-dithioloctanoic acid and the subsequent purification of crude α-lipoic acid wherein a benzene-insoluble linear disulfide polymer of α-lipoic acid is formed, the method of recovering salts of α-lipoic acid from said polymer which consists in warming said polymer with an aqueous alkaline solution to produce a solution of the corresponding alkaline salt of α-lipoic acid.

5. In a method of producing α-lipoic acid by the oxidation of DL-6,8-dithioloctanoic acid and the subsequent purification of crude α-lipoic acid wherein a benzene-insoluble linear disulfide polymer of α-lipoic acid is formed, the method of recovering salts of α-lipoic acid from said polymer which consists in warming said polymer with an aqueous alkaline solution to produce a solution of the corresponding alkaline salt of α-lipoic acid, acidifying the resulting solution and extracting α-lipoic acid therefrom with a water-immiscible organc solvent for α-lipoic acid.

References Cited in the file of this patent

UNITED STATES PATENTS 2,766,257  Holly _____ Oct. 9, 1956

OTHER REFERENCES

Soper et al.: J. Am. Chem. Soc., vol. 76, pp. 4109–4112 (1954).

Wagner et al.: Journal of the American Chemical Society, vol. 78, pp. 5079–5081 (1956).